UNITED STATES PATENT OFFICE.

NATHAN SULZBERGER, OF NEW YORK, N. Y.

IODIN DUSTING-POWDER AND PROCESS FOR MAKING SAME.

1,329,148. Specification of Letters Patent. Patented Jan. 27, 1920.

No Drawing. Application filed October 14, 1915. Serial No. 55,756.

*To all whom it may concern:*

Be it known that I, NATHAN SULZBERGER, born in New York city, and a citizen of the United States, residing at New York city, in the county and State of New York, have invented new and useful Improvements in Iodin Dusting-Powders and Processes for Making Same, of which the following is a specification.

The iodin-dusting-powders today on the market, like iodoform, nosophen, aristol and the like, are chemical compounds lacking solubility in water. In consequence of this fact they tend to cake up the secretions of the wound and sites, they are desired to disinfect, thereby often interfering and retarding drainage. For this reason principally, such iodin dusting powders, as well as many others free from iodin but likewise insoluble in water like xeroform, dermatol, etc., have been disregarded by many practitioners, particularly as disinfectants in nose- and ear-work, where narrow passages present themselves and where free drainage is of especial importance.

I have found, that an iodin-dusting-powder possessing high disinfectant value and being free from this disadvantage and therefore particularly valuable in nose- and ear-work, can readily be prepared by spreading and distributing iodin in a very finely divided condition over a base—a carrier—, which is soluble in water. As such a carrier I have found boracic acid particularly valuable, since the same can be rendered into a very fine powder, which is readily soluble in water and easily impregnated with iodin in fine distribution, whereby such iodin can well exert its antiseptic properties, such iodin being finely distributed at the site of application concomitantly as the boracic acid is dissolved in the aqueous secretions, always present in the tissues and mucous membranes, which are to be disinfected. The fact of being hygroscopic is of high advantage in this powder also for the reason, that by virtue of the same the secretions and bodies of a liquid nature tend to be drawn to the surface, osmosis started up, where they can more readily be treated and brought in contact with fresh amounts of the iodin powder. For this reason, the presence of an hygroscopic action in a dusting-powder is particularly desirable when the disinfectation and sterilization of the narrow aural and nasal passages are desired. The combination besides of two disinfectants of entirely different chemical nature (boracic acid possessing also *per se* antiseptic action) is also an advantage of such iodin-dusting-powders, since it has been scientifically demonstrated that bacteriæ, when treated with one and the same antiseptic, often become immune and resistant against the action of the same.

In the following, I describe a method of preparing such iodin-dusting-powders, it being distinctly understood, however, that I am not limiting myself to the method here described or to the quality or quantity of materials employed in the below given illustration:—

To a solution of boracic acid in alcohol, was added an alcoholic solution containing iodin. After freeing from the alcohol, a brownish powder was obtained, which on being spread over a sheet of white paper readily discolored the same by virtue of its iodin content and which powder becomes whiter in color on being exposed to the air by giving off more or less of its iodin content. When brought in contact with water, the boracic acid of the powder is readily dissolved out of the same, the water taking on a brown coloration. It is preferable when preparing the powder to employ a solution of iodin containing an excess of iodin over the amount desired to be contained in the finished dusting-powder, as during the process of evaporation to free from the iodin solvent, some of the iodin goes off with such solvent. I prefer in many cases, especially for nose- and ear-work, to employ a dusting-powder containing about five per cent. of iodin. Other solvents or mixtures of same for the iodin than alcohol may be used, as for instance, particularly also ether; it is not necessary that the boracic acid be in solution. It is advantageous to use an iodin solvent possessing a low boiling point, as smaller amounts of iodin will concomitantly be carried off with the solvent, when evaporating the same out of the dusting-powder. In cases vacuum evaporation will be found of advantage.

By employing the iodin in form of a solution, the same will be more finely precipitated upon the boracic acid; in cases, however, a mechanical mixture of the iodin with the boracic acid may be found serviceable.

Mixtures of iodin and boracic acid also with other substances possessing pharmaceutical value, shall be considered as coming under the scope of this invention.

It will accordingly be seen that the antiseptic powders of the present invention, which are adapted for use as dusting powders, are made of boric acid in intimate association or combination with iodin in amounts sufficient to exert the desired antiseptic properties so that the product possesses the antiseptic properties of both the iodin and the boracic acid, the iodin being distributed throughout the boracic acid and the impregnation or intimate association being preferably effected as above described, e. g., by treating the boracic acid with a solution of iodin and evaporating the solvent.

I claim:—

1. An antiseptic powder adapted for use as a dusting powder and comprising boracic acid intimately combined with iodin in amount sufficient to exert antiseptic properties, the iodin being distributed throughout the boracic acid by deposition from solution.

2. An antiseptic powder adapted for use as a dusting powder and comprising boracic acid impregnated with less than 10 per cent. of iodin but with sufficient iodin to exert antiseptic properties, the iodin being distributed throughout the boracic acid by deposition from solution.

3. Process for making an antiseptic dusting-powder which comprises the impregnation of boracic acid with iodin by treating such boracic acid with a solution of iodin and evaporating the iodin solvent.

NATHAN SULZBERGER.

Witnesses:
 Wm. C. Buethe,
 J. A. Garrick.